United States Patent
Yi

(12) United States Patent (10) Patent No.: US 6,509,716 B2
(45) Date of Patent: Jan. 21, 2003

(54) BATTERY CHARGER FOR CELLULAR PHONE, HAVING SPEAKER

(75) Inventor: Sang Yong Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/749,466

(22) Filed: Dec. 28, 2000

(65) Prior Publication Data

US 2001/0006336 A1 Jul. 5, 2001

(30) Foreign Application Priority Data

Dec. 30, 1999 (KR) .......................................... 99-66115

(51) Int. Cl.$^7$ ................................................. H02J 7/00
(52) U.S. Cl. ...................................................... 320/115
(58) Field of Search ................................ 320/115, 114; 379/419, 428.02, 428.04

(56) References Cited

U.S. PATENT DOCUMENTS

| | | | | |
|---|---|---|---|---|
| 5,479,479 A | * | 12/1995 | Braitburg et al. | 379/58 |
| 5,642,402 A | * | 6/1997 | Vilmi et al. | 379/420.02 |
| 6,052,603 A | * | 4/2000 | Kinzalow et al. | 455/557 |
| 6,075,999 A | * | 6/2000 | Vilmi et al. | 455/557 |
| 6,076,000 A | * | 6/2000 | Lee | 455/569 |
| 6,128,185 A | * | 10/2000 | Fuhs et al. | 361/683 |
| 6,226,536 B1 | * | 5/2001 | Miyashita | 455/425 |

FOREIGN PATENT DOCUMENTS

JP 10-285254 A * 11/1998 ............. H02J/1/00

* cited by examiner

*Primary Examiner*—Gregory J. Toatley, Jr.
(74) *Attorney, Agent, or Firm*—Fleshner & Kim, LLP

(57) ABSTRACT

A battery charger for a cellular phone, having a speaker includes an ear jack connected to an ear jack of the cellular phone, for transmitting a voice signal of the cellular phone to the battery charger, a voice amplifier for amplifying the voice signal from the ear jack, and a speaker for converting the voice signal output from the voice amplifier into voice. The battery charger for a cellular phone, having a speaker further includes a communication port connected to a communication port of the cellular phone when the cellular phone is inserted(connected) to the battery charger, for mutually transmitting the voice signal, and a selector for connecting either the communication port or the ear jack with the voice amplifier.

26 Claims, 6 Drawing Sheets

BATTERY CHARGER FOR CELLULAR PHONE, HAVING SPEAKER

BACKGROUND OF THE INVENTION

1. Field of the Invention

The present invention relates to a battery charger for a cellular phone, and more particularly, to a battery charger for a cellular phone, having a speaker which can play music to a listener and enable a telephone conversation in a speaker phone mode during charging the cellular phone.

2. Background of the Related Art

Generally, a battery charger for a cellular phone charges a battery through a connection terminal at the rear of the battery in a state that the battery is only inserted into the battery charger or the cellular phone having the battery is inserted into the battery charger.

FIG. 1 is a perspective view illustrating a related art battery charger for a cellular phone, FIG. 2 is a front view illustrating a related art battery charger into which a cellular phone is inserted, FIG. 3 shows a side view and a rear view of a related art battery charger, and FIG. 4 is a block diagram illustrating a related art battery charger for a cellular phone.

As shown in FIG. 1, the related art battery charger for a cellular phone includes a main body 5 provided with a charging terminal 11 to support the cellular phone when the cellular phone in inserted into the main body 5. Accordingly, if the cellular phone is inserted into the battery charger, a charging terminal 9 of a battery is connected with the charging terminal 11 of the battery charger to charge the battery of the cellular phone as shown in FIGS. 2 and 3.

Referring to FIG. 4, the related art battery charger for a cellular phone includes a filter 20 for eliminating noise of an externally input commercial alternating current voltage of 100~220V, a rectifying and sudden current restricting circuit 22 for converting the alternating current voltage having no noise into a direct current voltage and protecting an internal circuit from sudden variation of voltage and current, a switching and over current protecting circuit 24 for switching the direct current voltage output from the rectifying and sudden current restricting circuit 22 and preventing flow of the over current from occurring, a rectifying circuit 26 for rectifying again the voltage output from the switching and over current protecting circuit 24 to supply more stable direct current voltage, a feedback circuit 30 and a constant voltage integrated circuit 32 for sensing the output voltage of the rectifying circuit 26, and a microcomputer 38 and an output adjusting circuit 34 for controlling the operation of the battery charger.

The operation of the aforementioned battery charger for a cellular phone will now be described.

An external commercial power source becomes a direct current voltage state through the filter 20 and the rectifying and sudden current restricting circuit 22. Thus, the direct current voltage is output through the switching over current protecting circuit 24. The direct current voltage is rectified again by the rectifying circuit 26 so as to be supplied to the battery of the cellular phone as a stable direct current voltage, thereby charging the battery.

The microcomputer 38 senses an output terminal of the rectifying circuit 26 through the feedback circuit 30 and the constant voltage integrated circuit 32. The microcomputer 38 also controls the direct current voltage supplied to the battery through the output adjusting circuit 34, thereby outputting a constant voltage.

Furthermore, the microcomputer 38 senses a temperature of the battery so that the battery is charged only at a constant temperature. The microcomputer 38 also informs a user through a light emitting diode (LED) whether the battery is charging.

However, the related art battery charger for a cellular phone has a drawback in that it is only used for charging the battery of the cellular phone. Accordingly, it is impossible to listen to music during charging the battery of the cellular phone in even case that the cellular phone is designed to play MP3 music. Since it is possible to listen to music in only a standby state of the cellular phone after charging the battery, the battery is consumed quickly, thereby reducing call/standby time.

SUMMARY OF THE INVENTION

Accordingly, the present invention is directed to a battery charger for a cellular phone, having a speaker that substantially obviates one or more of the problems due to limitations and disadvantages of the related art.

An object of the present invention is to provide a battery charger for a cellular phone, having a speaker which can play music to a listener and enable a telephone conversation in a speaker phone mode during charging the cellular phone.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a battery charger for a cellular phone, having a speaker according to the present invention includes an ear jack connected to an ear jack of the cellular phone, for transmitting a voice signal of the cellular phone to the battery charger, a voice amplifier for amplifying the voice signal from the ear jack, and a speaker for converting the voice signal output from the voice amplifier into voice.

The battery charger for a cellular phone, having a speaker according to the present invention further includes a communication port connected to a communication port of the cellular phone when the cellular phone is inserted (connected) to the battery charger, for mutually transmitting the voice signal, and a selector for connecting either the communication port or the ear jack with the voice amplifier.

In addition, the battery charger for a cellular phone, having a speaker according to the present invention further includes a memory for storing a music signal input from the communication port.

Preferably, the selector connects the ear jack with the voice amplifier if the ear jack of the cellular phone is connected with the ear jack of the battery charger, while the selector connects the communication port with the voice amplifier if the communication port of the cellular phone is connected with the communication port of the battery charger.

In another aspect, a battery charger for a cellular phone, having a speaker according to the present invention includes a communication port connected to a communication port of the cellular phone when the cellular phone is inserted (connected) to the battery charger, for mutually transmitting a voice signal, a voice amplifier for amplifying the voice signal from the communication port, and a speaker for converting the voice signal output from the voice amplifier into voice.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5b is a bottom view of the cellular phone of FIG. 5a;

FIG. 6b is a partially enlarged view of a portion A of FIG. 6a; and

DETAILED DESCRIPTION OF THE PREFERRED EMBODIMENTS

Reference will now be made in detail to the preferred embodiments of the present invention, examples of which are illustrated in the accompanying drawings.

Figure 5A:
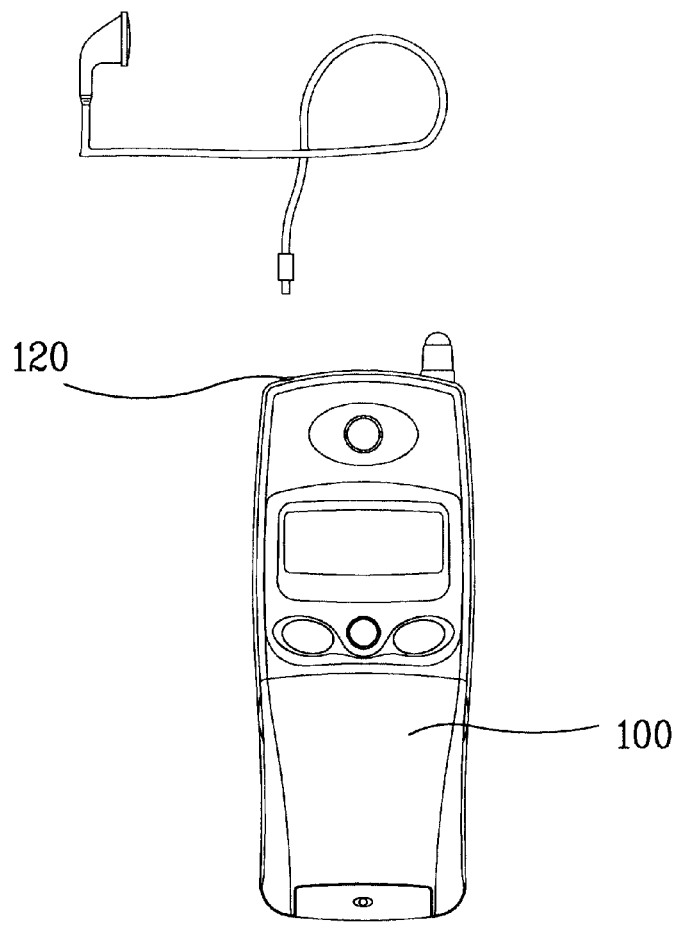
FIG. 5a is a front view illustrating a cellular phone in which a general ear jack can be used.
Figure 5B:
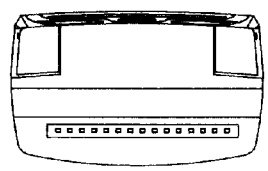
Figure 6A:
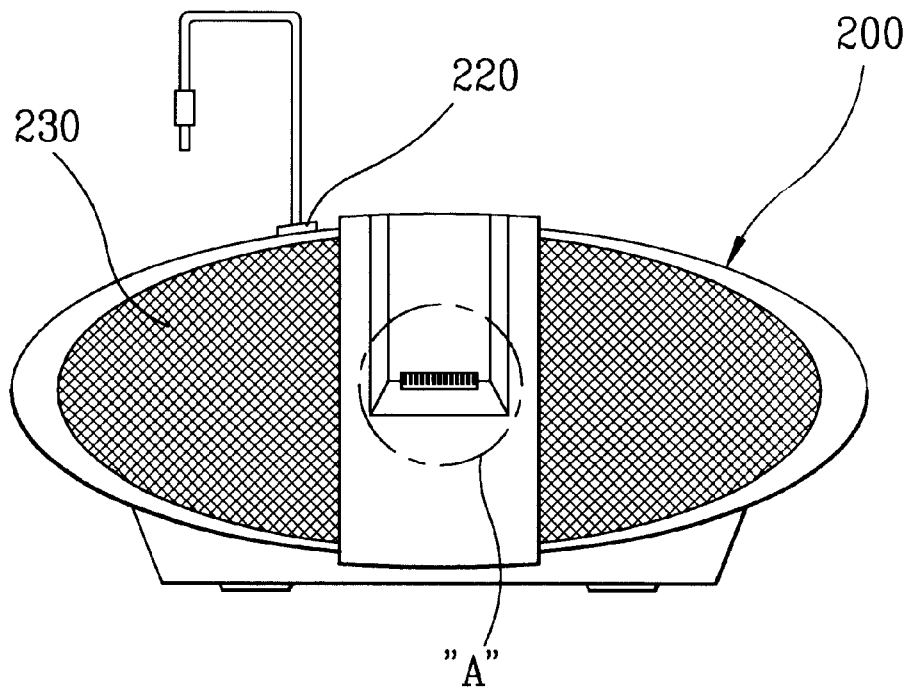
FIG. 6a is a front view illustrating a battery charger for a cellular phone, having a speaker in accordance with the present invention.
Figure 6B:
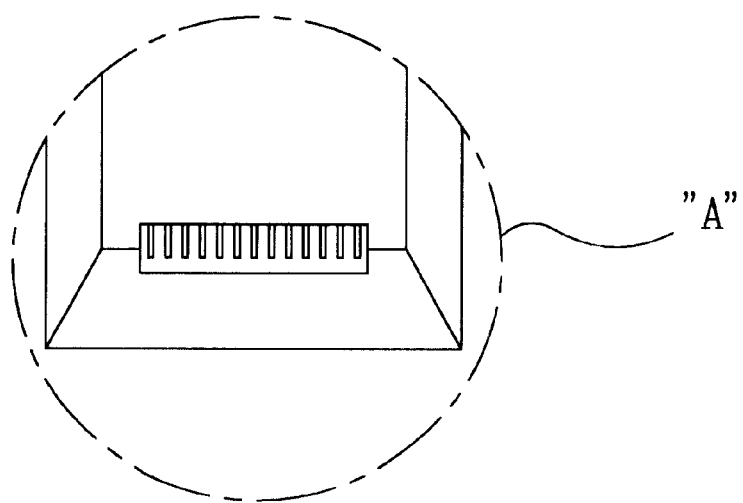
Figure 7:
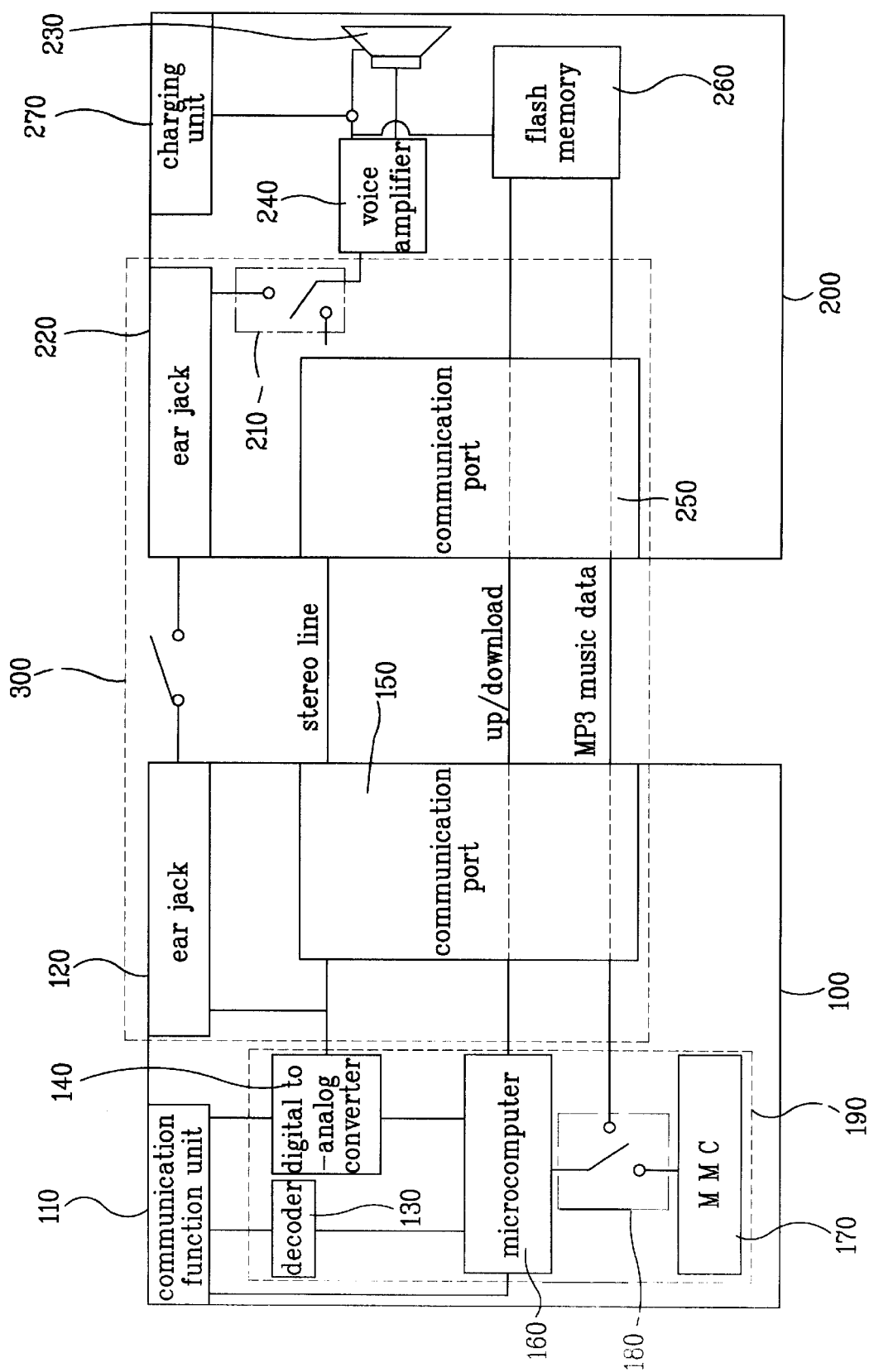
FIG. 7 is a block diagram illustrating a battery charger for a cellular phone, having a speaker in accordance with the present invention.

FIG. 5a is a front view illustrating a cellular phone in which a general ear jack can be used, FIG. 5b is a bottom view of the cellular phone of FIG. 5a, FIG. 6a is a front view illustrating a battery charger for a cellular phone, having a speaker in accordance with the present invention, FIG. 6b is a partially enlarged view of a portion A of FIG. 6a, and FIG. 7 is a block diagram illustrating a battery charger for a cellular phone, having a speaker in accordance with the present invention.

Figure 1:
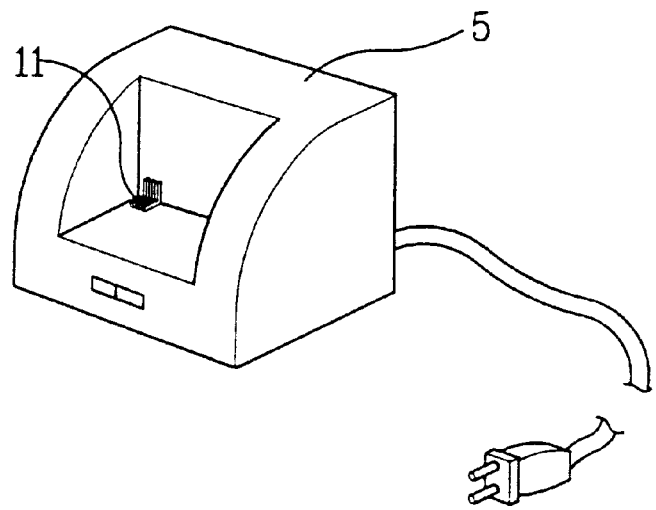
FIG. 1 is a perspective view illustrating a related art battery charger for a cellular phone.
Figure 2:
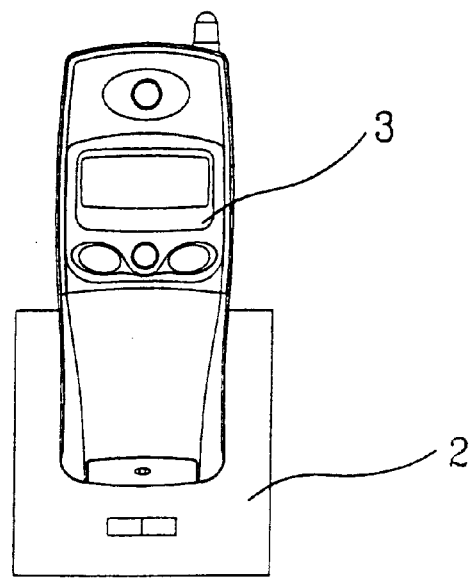
FIG. 2 is a front view illustrating a related art battery charger into which a cellular phone is inserted.
Figure 3:
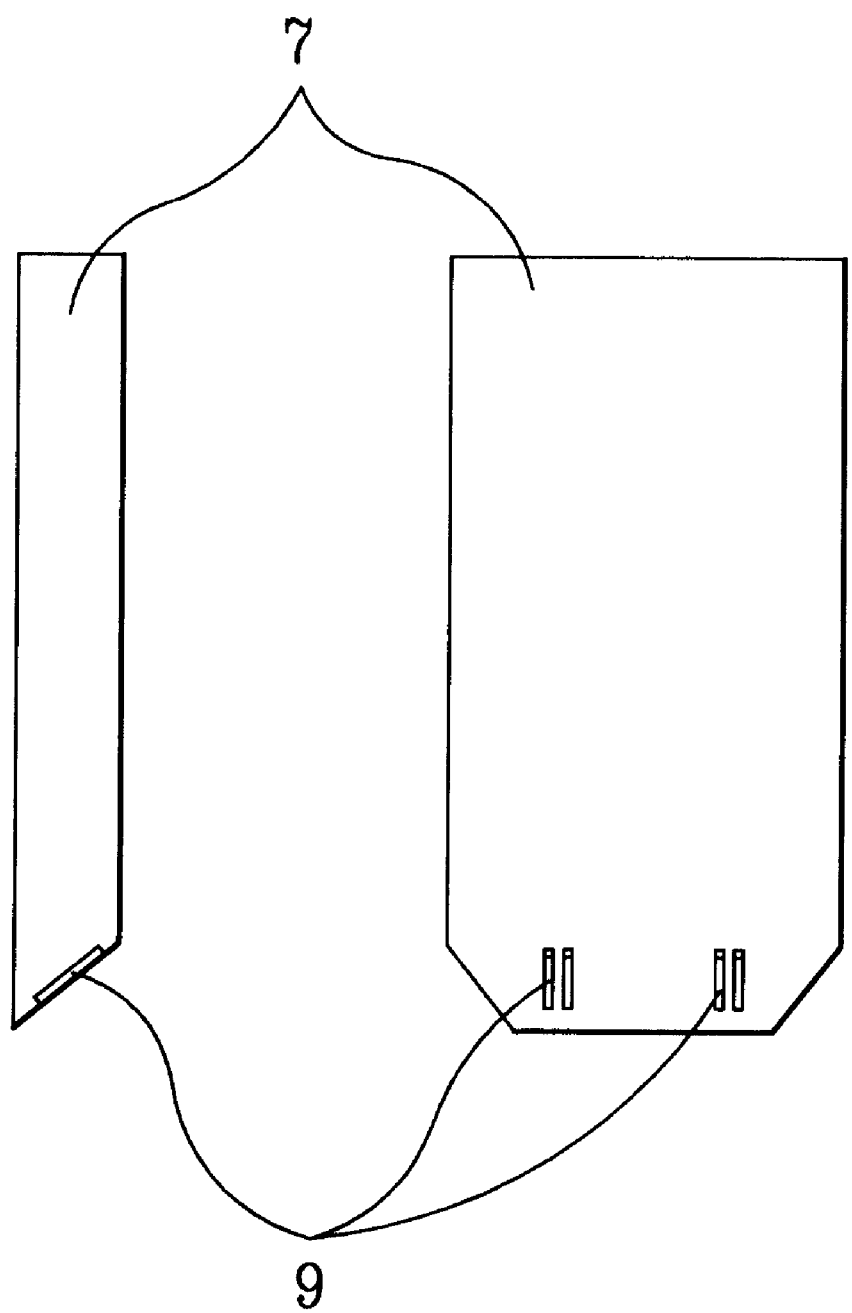
FIG. 3 shows a side view and a rear view of a related art battery charger.
Figure 4:
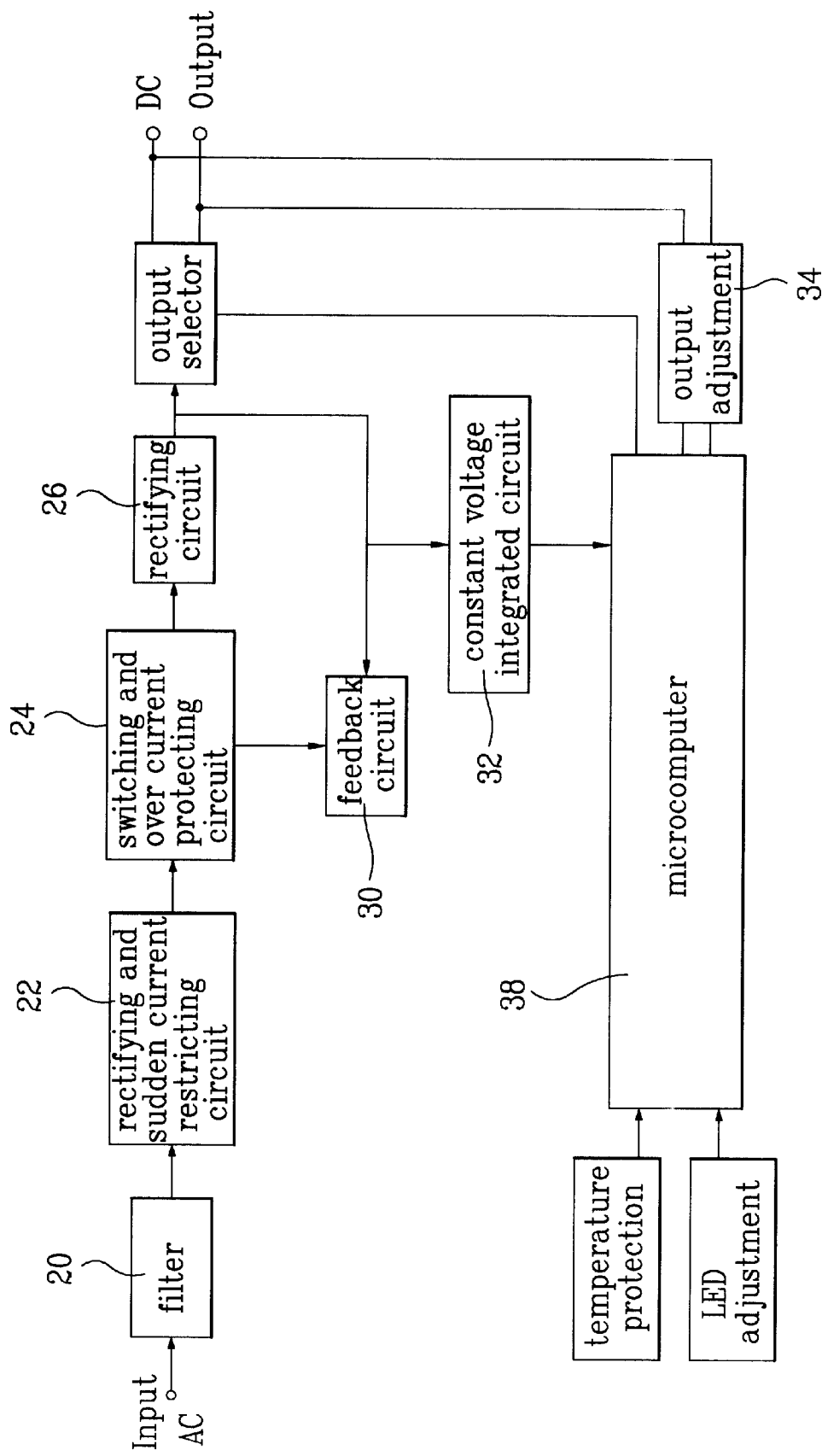
FIG. 4 is a block diagram illustrating a related art battery charger for a cellular phone.

The battery charger for a cellular phone, having a speaker according to the present invention further includes the following configuration in a state that circuits for charging the battery of the cellular phone are provided as shown in FIG. 4.

That is, as shown in FIGS. 6a, 6b and 7, the battery charger for a cellular phone, having a speaker includes an ear jack 220 for transmitting a voice signal of a cellular phone 100 to a battery charger 200 through an ear jack 120 of the cellular phone 100, a communication port 250 connected to a communication port 150 of the cellular phone 100 when the cellular phone 100 is inserted (connected) to the battery charger 200, for mutually transmitting the voice signal of the cellular phone 100, and a memory 260 for storing a music signal from the cellular phone 100 through the communication port 250. The battery charger further includes a selector 210 for selecting the voice signal from the ear jack 220 or the voice signal from the communication port 250 in accordance with insertion of the cellular phone 100 into the battery charger 200, a voice amplifier 240 for amplifying the voice signal selected by the selector 210, and a speaker 230 for converting the voice signal output from the voice amplifier 240 into voice.

The selector 210 connects the ear jack 220 with the voice amplifier 240 by mechanical movement if the ear jack 220 of the battery charger 200 is connected with the ear jack 120 of the cellular phone 100. A microcomputer 38 shown in FIG. 4 senses whether the communication port 150 of the cellular phone 100 is connected with the communication port 250. If the communication port 150 of the cellular phone 100 is connected with the communication port 250, the microcomputer 38 can control the selector 210 to connect the communication port 250 with the voice amplifier 240.

A communication port separately mounted in the cellular phone in addition to a charging terminal of the battery of the cellular phone may be used as the communication ports 150 and 250. The communication ports 150 and 250 include a charging terminal for charging the battery of the cellular phone, a voice signal transmitting terminal for transmitting the voice signal, and a sensing terminal for sensing whether the communication ports are connected with each other.

Furthermore, the selector 210, the voice amplifier 240, and the speaker 230 are designed to be driven by the direct current voltage converted to charge the battery of the cellular phone as shown in FIG. 4.

The battery charger may further include a decoder and a digital-to-analog converter to reproduce and process data stored in the memory 260. Thus, it is possible to listen to music in even case that the battery charger is not connected with the cellular phone.

In another embodiment, the ear jack 220, the voice amplifier 240, and the speaker 230 may only be provided to listen to music during charging the battery. In yet another alternative, the communication port 250, the voice amplifier 240, and the speaker 230 may only be provided.

The operation of the aforementioned battery charger for a cellular phone, having a speaker according to the present invention will be described.

MP3 files are reproduced by an MP3 unit (microcomputer) 160, a decoder 130, and a digital-to-analog converter 140. That is, the MP3 files are stored in a multimedia card (MMC) of the cellular phone 100. After the MP3 files are reproduced in the microcomputer 160, the MP3 files are transmitted to the digital-to-analog converter 140. The digital-to-analog converter 140 converts the reproduced MP3 digital signal into an analog signal. Thus, it is possible to listen to the MP3 music through either a speaker of the cellular phone 100 or an ear phone connected with the ear jack 120 of the cellular phone 100.

Furthermore, when a user connects the ear jack 120 of the cellular phone 100 with the ear jack 220 of the battery charger the analog MP3 music signal converted by the digital-to-analog converter 140 is transmitted to the voice amplifier 240 of the battery charger 200 through the ear jacks 120 and 220. The analog signal is amplified by the voice amplifier 240 and then output through a speaker 230 of the battery charger 200.

When the battery charger 200 is connected to the cellular phone 100 to charge the cellular phone 100 but without the ear jack 220 being connected, the analog MP3 music signal is transmitted to the voice amplifier 240 of the battery charger 200 through the communication port 150 of the cellular phone 100 and the communication port 250 of the battery charger 200. The analog MP3 music signal is then amplified by the voice amplifier 240 and then output through the speaker 230.

If the ear jack 220 of the battery charger 200 is connected with the ear jack 120 of the cellular phone 100, the selector 210 automatically connects the ear jack 220 with the voice amplifier 240. If the communication ports 150 and 250 are connected with each other, the selector 210 connects the communication port 250 with the voice amplifier 240. If the communication ports 150 and 250 are connected with each other and the ear jacks are also connected with each other, the selector 210 first connects the ear jack 220 with the voice amplifier 240.

Accordingly, if the ear jack 120 of the cellular phone 100 is connected with the ear jack 220 of the battery charger 200, the voice signal is transmitted to the voice amplifier 240 through the ear jacks 120 and 220. The transmitted signal is amplified by the voice amplifier 240 and then output to the speaker 230. If the ear jack 120 of the cellular phone 100 is separated from the ear jack 220 of the battery charger 200, the communication port 150 of the cellular phone 100 is connected with the communication port 250 of the battery charger 200 via stereo line, so that the voice signal is transmitted to the voice amplifier 240 via the stereo line. The transmitted signal is amplified by the voice amplifier 240 and then output to the speaker 230.

The MP3 files stored in an MMC 170 within the cellular phone 100 may be reproduced. Alternatively, the MP3 files stored in a flash memory 260 within the battery charger 200 may be reproduced. A switch 180 provided in the cellular phone 100 may be selected to reproduce the MP3 files.

Furthermore, the MP3 files stored in the MMC 170 of the cellular phone 100 may be stored in the flash memory 260 of the battery charger 200. On the contrary, the MP3 files of the battery charger 200 may be stored in the MMC 170 of the cellular phone 100.

When the MP3 files move or the MP3 files stored in the battery charger 200 are reproduced, data transmission is performed through the communication ports 150 and 250. The reproduced voice signal is transmitted through the ear jacks 120 and 220 if the ear jacks 120 and 220 are connected with each other. The reproduced voice signal is transmitted through the communication ports 150 and 250 if the ear jacks 120 and 220 are not connected with each other.

Moreover, in the present invention, the MP3 files stored in the cellular phone 100 or the battery charger 200 can be reproduced to listen to music, and at the same time a telephone conversation is possible through a microphone (not shown) of the cellular phone 100 and the speaker 230 of the battery charger 230 if a speaker phone mode is selected in the cellular phone 100.

In the battery charger for a cellular phone, having a speaker according to the present invention, it is possible to listen to music through the speaker of the battery charger and conduct a telephone conversation, whether or not the cellular phone battery is charging. Since the battery charger is provided with the memory, the MP3 files can be stored in the memory.

As aforementioned, the battery charger for a cellular phone, having a speaker according to the present invention has the following advantages.

First, the battery charger for a cellular phone, having a speaker according to the present invention is provided with the memory, the voice amplifier and the speaker in addition to the basic charging circuit. Accordingly, the MP3 music of the cellular phone can down-up load in the battery charger.

Second, since the music files can be reproduced through the speaker mounted in the cellular phone, it is possible to listen to music through the cellular phone in a wide space in the same manner as an audiocassette. Stereo sound may be enjoyed by mounting two speakers.

Third, it is possible to conduct a telephone conversation through the speaker mounted in the battery charger in a speaker phone mode during charging the cellular phone.

Finally, since it is possible to listen to music and conduct a telephone conversation during charging the cellular phone, it is possible to prevent call/standby time from being reduced due to battery consumption caused by reproduction of music and the telephone conversation in a state that the cellular phone is separated from the battery charger after charging the cellular phone.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A charger for a cellular phone, comprising:
    a digital-to-analog converter configured to receive an audio signal in digital format from the cellular phone and output an analog audio signal;
    an amplifier configured to receive the analog audio signal from the digital-to-analog converter and amplify the analog audio signal received from a cellular phone; and
    a speaker configured to receive the analog audio signal from the amplifier.

2. The charger of claim 1, wherein the audio signal received from the cellular phone is coupled to the charger via an ear jack.

3. The charger of claim 1, wherein the audio signal received from the cellular phone is coupled to the charger via a stereo output line.

4. The charger of claim 1, further comprising a microprocessor configured to control an audio signal coupled to the audio amplifier.

5. The charger of claim 1, wherein the digital format comprises MP3 encoding.

6. The charger of claim 1, further comprising a memory device configured to store a digital audio signal.

7. The charger of claim 6, further comprising an input/output port configured to transfer a digital file between the memory device and the cellular phone.

8. A cellular phone system for a communications network, comprising:
    a cellular phone;
    a charger configured to receive and charge the cellular phone, wherein the charger comprises:
        a digital-to-analog converter configured to receive a digital audio signal from the cellular phone and output an analog audio signal;
        an amplifier configured to receive and amplify the analog audio signal from the cellular phone digital-to-analog converter; and
        a speaker configured to convert the analog audio signal into audible sound.

9. The cellular phone system of claim 8, wherein the audio signal from the cellular phone is coupled to the charger via an ear jack.

10. The cellular phone system of claim 8, wherein the audio signal from the cellular phone is coupled to the charger via a stereo output line.

11. The cellular phone system of claim 8, further comprising a microprocessor configured to switch an audio signal to the audio amplifier.

12. The cellular phone system of claim 8, wherein the digital audio signal is in a MP3 format.

13. The cellular phone system of claim 8, wherein the charger further comprises a memory device configured to store a digital audio signal.

14. The cellular phone system of claim 13, further comprising an input/output port configured to transfer data between the memory device of the charger and the cellular telephone.

15. A mobile phone battery charger, comprising:
   a charger ear jack configured to be connected to a mobile phone ear jack;
   a charger communication port configured to be connected to a mobile phone communication port;
   an audio signal amplifier configured to receive an audio signal from said charger ear jack and said charger communication port; and
   a speaker configured to be driven by an audio signal from said audio signal amplifier.

16. The mobile phone battery charger of claim 15, further comprising a selector configured to selectively connect either said charger communication port or said charger ear jack to said audio signal amplifier.

17. The mobile phone battery charger of claim 6, further comprising a memory configured to store an audio signal from said charger communication port.

18. The mobile phone battery charger of claim 6, wherein said selector is configured to connect said charger ear jack with said audio signal amplifier if said charger ear jack is coupled to the mobile phone ear jack.

19. The mobile phone battery charger of claim 6, wherein said selector connects said charger communication port with said audio amplifier if said charger communication port is coupled to the mobile phone communication port.

20. The mobile phone battery charger of claim 6, wherein said charger communication port comprises a charger charging terminal configured to couple to a mobile phone charging terminal and a charger audio signal terminal configured to couple to a mobile phone audio signal terminal.

21. The mobile phone battery charger of claim 20, wherein said charger communication port further comprises a sensing terminal configured to sense whether the charger communication port is coupled to the mobile phone communication port.

22. The mobile phone battery charger of claim 15, wherein said audio signal amplifier is configured to receive power from said mobile phone battery charger.

23. A mobile phone battery charger, comprising:
   a charger communication port configured to be connected to a mobile phone communication port, and further configured to convey an audio signal to or from the mobile phone communication port;
   a memory coupled to the charger communication port configured to store an audio signal;
   an audio amplifier configured to receive and amplify an audio signal from the mobile phone communication port or from the memory; and
   a speaker configured to be driven by an audio signal from said audio signal amplifier.

24. The mobile phone battery charger of claim 23, wherein said charger communication port comprises a charger charging terminal configured to couple power to the mobile phone battery and a charger transmitting terminal configured to couple an audio signal between said mobile phone battery charger and the mobile phone.

25. The mobile phone battery charger of claim 24, wherein said charger communication port further comprises a sensing terminal configured to sense when said charger communication port is coupled to a mobile phone communication port.

26. The mobile phone battery charger of claim 23, wherein said audio signal amplifier is configured to be powered by said mobile phone battery charger.

* * * * *